US012688978B2

(12) United States Patent
Bozkurt et al.

(10) Patent No.: US 12,688,978 B2
(45) Date of Patent: *Jul. 21, 2026

(54) GEL ELECTROLYTE SUPERCAPACITOR

(71) Applicant: Imam Abdulrahman Bin Faisal University, Dammam (SA)

(72) Inventors: Ayhan Bozkurt, Dammam (SA); Emre Cevik, Dammam (SA); Seyda Tugba Gunday Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 133 days.

This patent is subject to a terminal disclaimer.

(21) Appl. No.: 18/909,301

(22) Filed: Oct. 8, 2024

(65) Prior Publication Data

US 2025/0029794 A1 Jan. 23, 2025

Related U.S. Application Data

(63) Continuation of application No. 17/709,713, filed on Mar. 31, 2022, now Pat. No. 12,142,425.

(51) Int. Cl.
| | |
|---|---|
| *H01G 11/24* | (2013.01) |
| *H01G 11/32* | (2013.01) |
| *H01G 11/48* | (2013.01) |
| *H01G 11/56* | (2013.01) |

(52) U.S. Cl.
CPC ............. *H01G 11/24* (2013.01); *H01G 11/32* (2013.01); *H01G 11/48* (2013.01); *H01G 11/56* (2013.01)

(58) Field of Classification Search
None
See application file for complete search history.

(56) References Cited

U.S. PATENT DOCUMENTS

| | | | |
|---|---|---|---|
| 2,078,772 A | 4/1937 | Pitt | |
| 2,757,140 A | 7/1956 | Bush | |
| 6,522,524 B1 | 2/2003 | Feger et al. | |
| 11,769,639 B2 | 9/2023 | Asiri | |
| 11,955,279 B2 | 4/2024 | Asiri | |
| 12,142,425 B2 * | 11/2024 | Bozkurt | H01G 11/48 |
| 2018/0301290 A1 | 10/2018 | Ogihara | |
| 2023/0268137 A1 | 8/2023 | Asiri | |
| 2024/0145180 A1 | 5/2024 | Asiri | |

FOREIGN PATENT DOCUMENTS

| | | |
|---|---|---|
| CN | 111804246 A | 10/2020 |
| CN | 113224370 A | 8/2021 |

OTHER PUBLICATIONS

"Non-Aqueous Electrolytes and Their Characteristics", Electrolytic Capacitors, Faradnet, https://web.archive.org/web/20160617163728/http://www.faradnet.com/deeley/chapt_10.htm#index, Part III: Chapter 10, Apr. 3, 2000, 21 pages.

Yuki Kato, et al., "Thermally stable solid polymer electrolyte containing borate ester groups for lithium secondary battery", Solid State Ionics, vols. 152-153, Dec. 2002, pp. 155-159 (Abstract only).

R C Saini, et al., "Studies on AC Dielectric Properties of Anodic Oxide Films on Superpurity Aluminium From Glycol-Borate Electrolyte", Indian Journal of Chemistry, vol. 24A, Jan. 1985, pp. 20-23.

* cited by examiner

*Primary Examiner* — Eric W Thomas

(74) *Attorney, Agent, or Firm* — Oblon, McClelland, Maier & Neustadt, L.L.P.

(57) ABSTRACT

A supercapacitor including a gel electrode and two electrodes is described. Each of the two electrodes include a second mixture of 5-10 wt. % conductive additive, 5-10 wt. % binding compound, and 80-90 wt. % activated carbon. Further, the second mixture is at least partially coated on an inner surface of a substrate, and where the inner surfaces of the two electrodes are separated by and in physical contact with the gel electrolyte to form the supercapacitor. The gel electrolyte includes a polyol compound, a base with a molarity (M) of 1-5 in the polyol compound, and 1-10 wt. % of boric acid relative to the weight of the polyol compound. The boric acid intercalates with a first mixture of the polyol compound and the base, creating a gel.

20 Claims, 14 Drawing Sheets

100

102 — Mix the base and the polyol compound at a temperature of 40-60°C to form a mixture 104 — Cool the mixture to 23- 26°C and add boric acid to form a gel electrolyte

GEL ELECTROLYTE SUPERCAPACITOR

CROSS-REFERENCE TO RELATED APPLICATIONS

The present application is a Continuation of U.S. application Ser. No. 17/709,713, now allowed, having a filing date of Mar. 31, 2022.

TECHNICAL FIELD

The present disclosure is directed to electrolytes, and particularly to a gel electrolyte for electrochemical layer double-layer energy storage in a supercapacitor, a method of making the gel electrolyte, and supercapacitors containing the gel electrolyte.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy storage devices such as supercapacitors, are the most promising way to store or release a considerable amount of excess electrical energy. Supercapacitors offer many advantages such as uninterruptible power, high storage capacity, and superior cycle number.

The choice of an electrolyte plays a critical role in supercapacitor performance. Typically, a suitable electrolyte offers a wide voltage window, high electrochemical stability, high ionic concentration and conductivity, low viscosity, and low toxicity. In recent years, bio-based polymer electrolytes, such as starch, chitosan, and vegetable oil-based polymers, are increasingly used as alternatives to conventional electrolytes in supercapacitors due to low toxicity, light weight, and ease of fabrication to electrochemical devices. More recently, gel polymer electrolytes are also being used in the application of electrochemical devices. Gel electrolytes allow for flexible energy storage devices, and although several gel-based electrolytes have been reported in the literature, there exists a need to develop electrolytes with high ionic conductivity, chemical stability, and electrochemical stability to assemble supercapacitors with prolonged cycle life. Accordingly, it is one object of the present disclosure to provide a gel electrolyte which may substantially reduce or eliminate the above limitations.

SUMMARY

In an exemplary embodiment, a supercapacitor is described. The supercapacitor includes two electrodes and a gel electrolyte. The gel electrolyte includes a polyol compound, a base with molarity (M) of 1-5 in the polyol compound, and 1-10 weight percent (wt. %) of boric acid relative to the weight of the polyol compound. The boric acid intercalates with a first mixture of the polyol compound and the base, creating a gel. The polyol compound is glycerol or ethylene glycol, and the base is selected from a group consisting of lithium hydroxide, sodium hydroxide, and potassium hydroxide. Each of the two electrodes includes a second mixture of 5-10 wt. % conductive additive, 5-10 wt. % binding compound, and 80-90 wt. % activated carbon, based on the total weight of the conductive additive, the binding compound, and the activated carbon. The second mixture is at least partially coated on an inner surface of a substrate, where an outer surface of the substrate is not coated with the second mixture. The inner surfaces of the two electrodes are separated by and in physical contact with the gel electrolyte to form the supercapacitor.

In some embodiments, the polyol compound is glycerol, and the base is potassium hydroxide.

In some embodiments, the gel electrolyte has a glass transition temperature of −90 to −60° C., where the gel electrolyte comprises 2-4% boric acid.

In some embodiments, the gel electrolyte has an ionic conductivity of $2\times10^{-3}$-$4\times10^{-3}$ Siemens per centimetre (S/cm).

In some embodiments, the gel electrolyte produces no fire after treatment with a flame.

In an exemplary embodiment, a method for making a gel electrolyte is described. The method includes mixing the base and the polyol compound at a temperature of 40-60 centigrade (° C.) to form a mixture, and further cooling the mixture to 23-26° C. and adding boric acid to form the gel electrolyte.

In some embodiments, the binding compound is at least one selected from the group consisting of polyvinylidene fluoride (PVDF) and N-methyl pyrrolidone (NMP), the conductive additive is at least one selected from the group consisting of graphite, activated carbon, reduced graphene oxide, carbon nanotubes, carbon nanofibers, and carbon black, and the substrate is a formed from at least one material selected from the group consisting of copper, aluminum, nickel, iron, and steel.

In some embodiments, the binding compound is PVDF, the conductive additive is carbon black, and the substrate is an aluminum current collector.

In some embodiments, the inner surface of the substrate is pre-coated with at least one boronic acid-containing polymer selected from the group consisting of poly(styreneboronic acid)-β-polystyrene, and poly(ethylene glycol)-β-poly(styrene boronic acid).

In some embodiments, the first mixture further includes 1-15 wt. % of at least one boronic acid-containing polymer selected from the group consisting of poly(styreneboronic acid)-β-polystyrene and poly(ethylene glycol)-β-poly(styrene boronic acid), based on the total weight of the polyol compound and the boronic acid-containing polymer.

In some embodiments, the second mixture further includes 1-10 wt. % of at least one boronic acid-containing polymer selected from the group consisting of poly(styreneboronic acid)-β-polystyrene, and poly(ethylene glycol)-β-poly(styrene boronic acid), based on the total weight of the conductive additive, the binding compound, the activated carbon, and the boronic acid-containing polymer.

In some embodiments, the supercapacitor has a specific capacitance of 300-350 farad per gram (F/g) at 1 ampere per gram (A/g), where the gel electrolyte comprises 2-4% boric acid.

In some embodiments, the supercapacitor has at least 90% of the initial capacitance maintained up to 10,000 cycles.

In some embodiments, the supercapacitor has at least 90% of the initial capacitance maintained after 30 days under ambient conditions.

In some embodiments, the supercapacitor has a specific energy of 40-55 watt-hour per kilogram (W·h/kg) at a power of 900-950 watts per kilogram (W/kg).

In some embodiments, the supercapacitor has an equivalent series resistance of 4-8Ω.

In some embodiments, the supercapacitor has an open voltage window of 0-3 V.

In some embodiments, the supercapacitor has a specific capacitance of 150-200 F/g at 1 A/g, where the gel electrolyte comprises 5-7% boric acid and 1M base.

In an exemplary embodiment, a wearable device including the supercapacitor is disclosed. The wearable device includes the supercapacitor that is electrically connected to a sensor and the supercapacitor functions like a battery.

In some embodiments, the supercapacitors may be 2-10 in number and connected in parallel and/or series.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

4

Figure 4A:
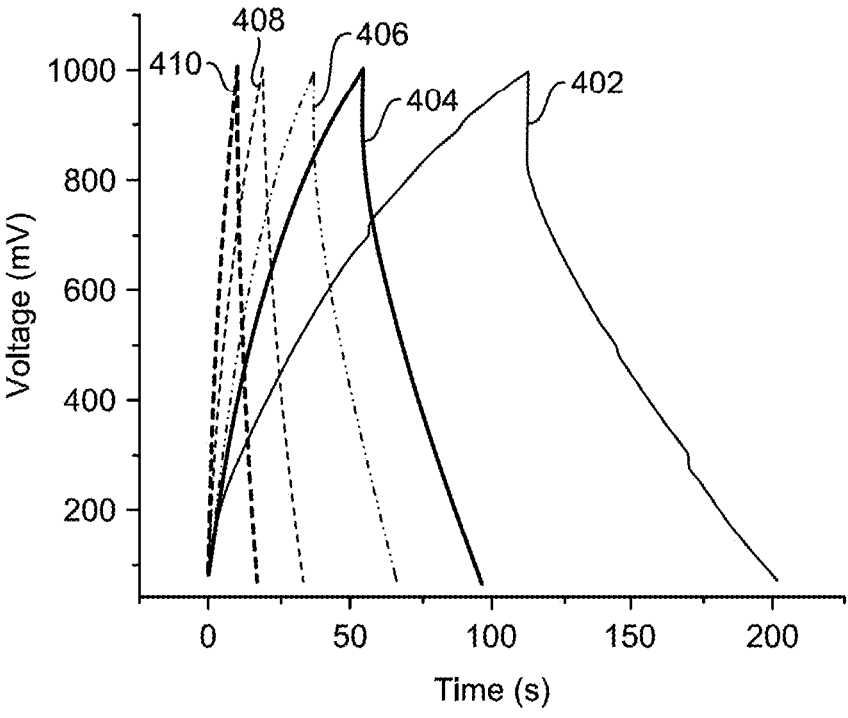
FIG. 4A illustrates galvanostatic charge-discharge (GCD) curves of a Gly/3KOH/5BA based supercapacitor device at different current densities, according to certain embodiments.
Figure 4B:
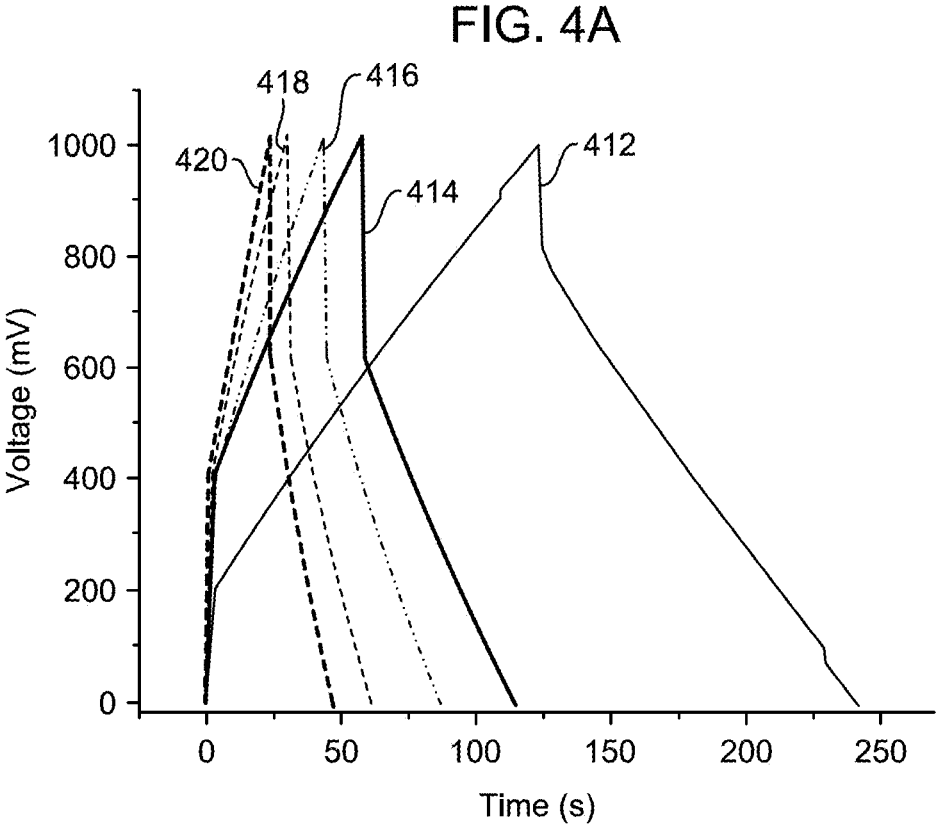
FIG. 4B illustrates the GCD curves of a Gly/1KOH/5BA based supercapacitor device at different current densities, according to certain embodiments.
Figure 4C:
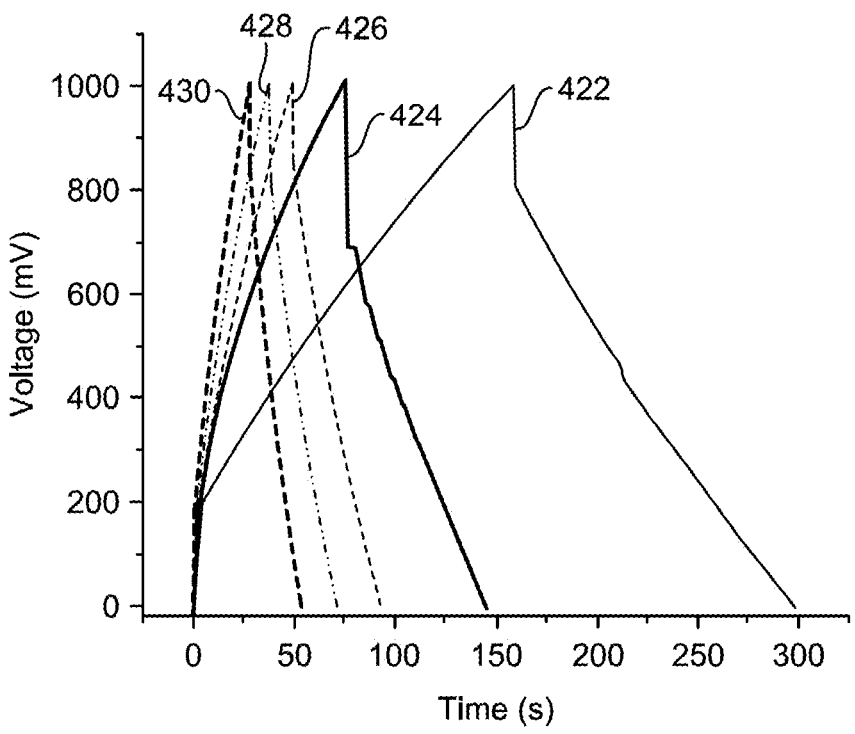
FIG. 4C illustrates the GCD curves of a Gly/3KOH/5BA based supercapacitor device at different current densities, according to certain embodiments.
Figure 4D:
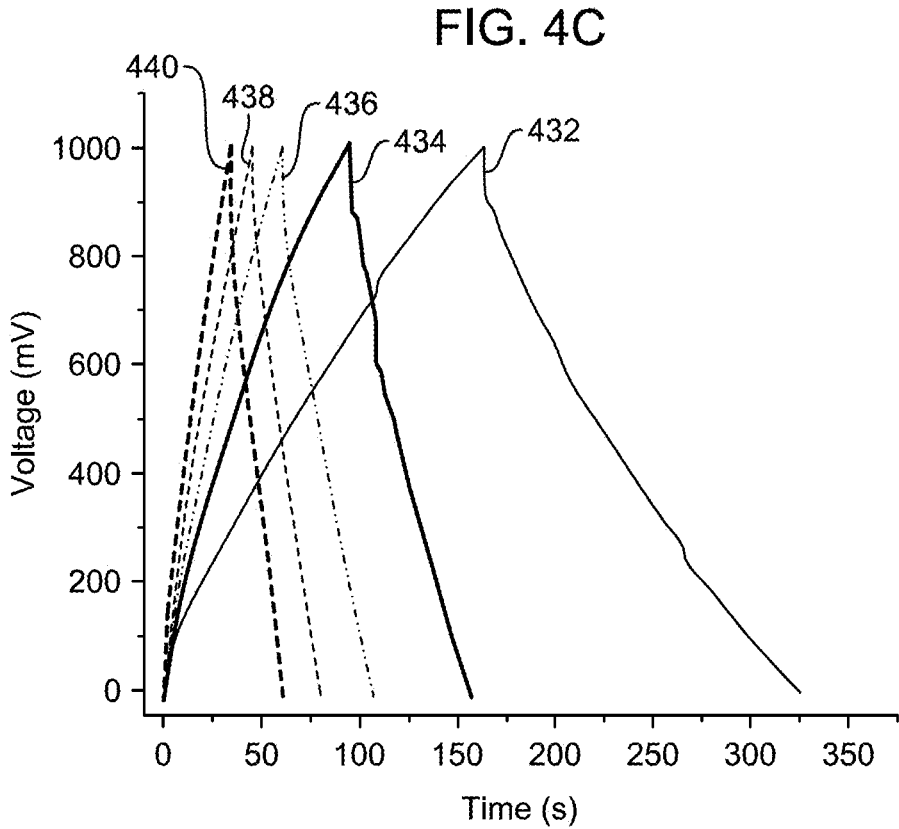
Figure 4E:
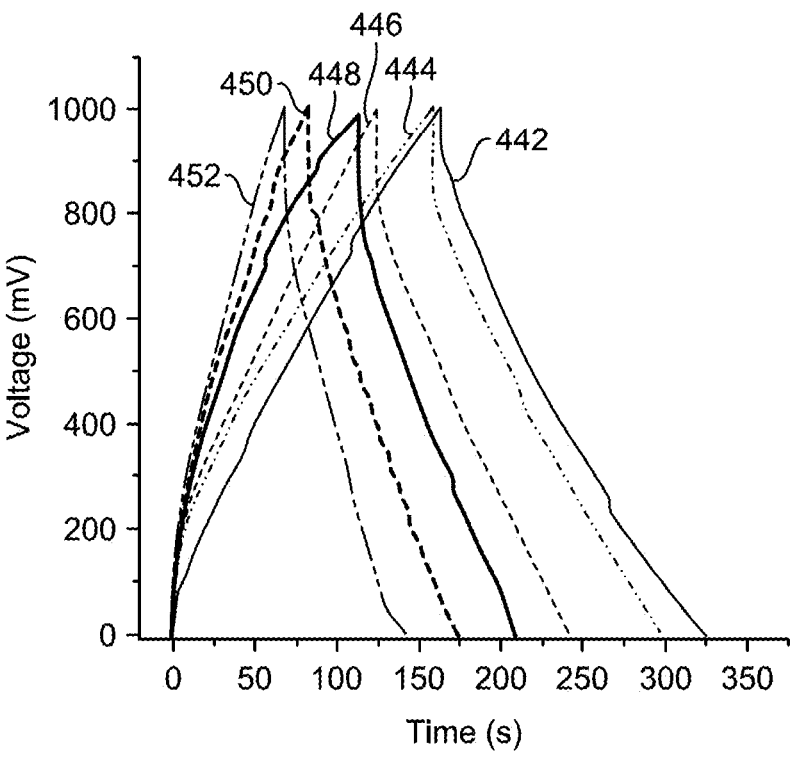
Figure 4F:
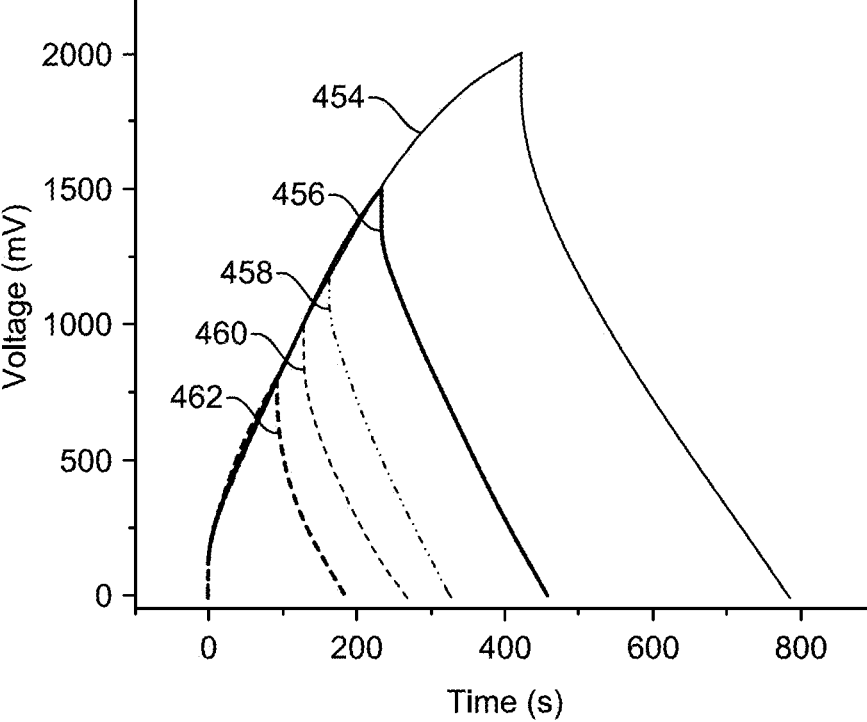
Figure 5A:
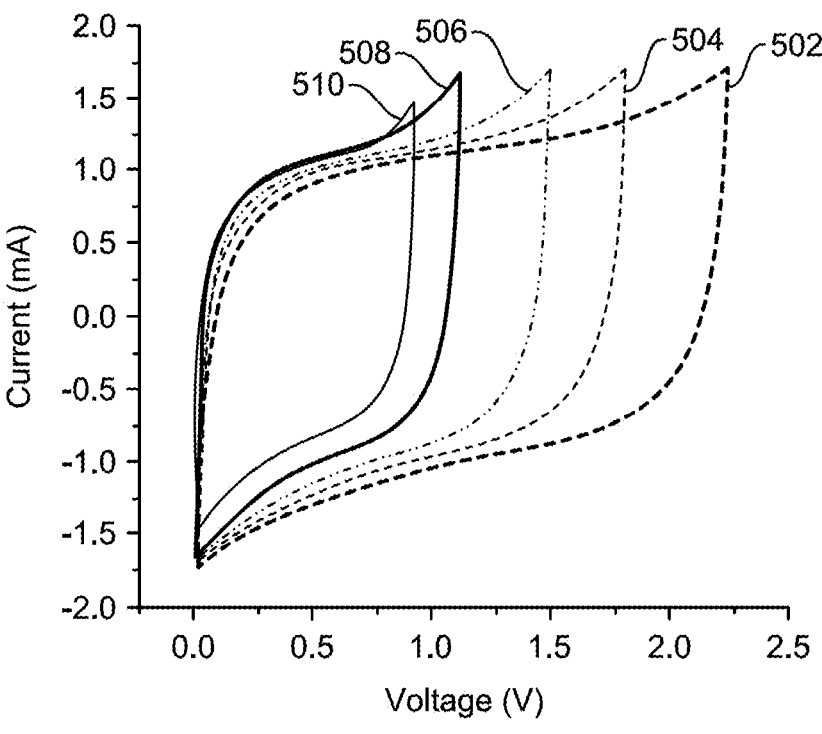
Figure 5B:
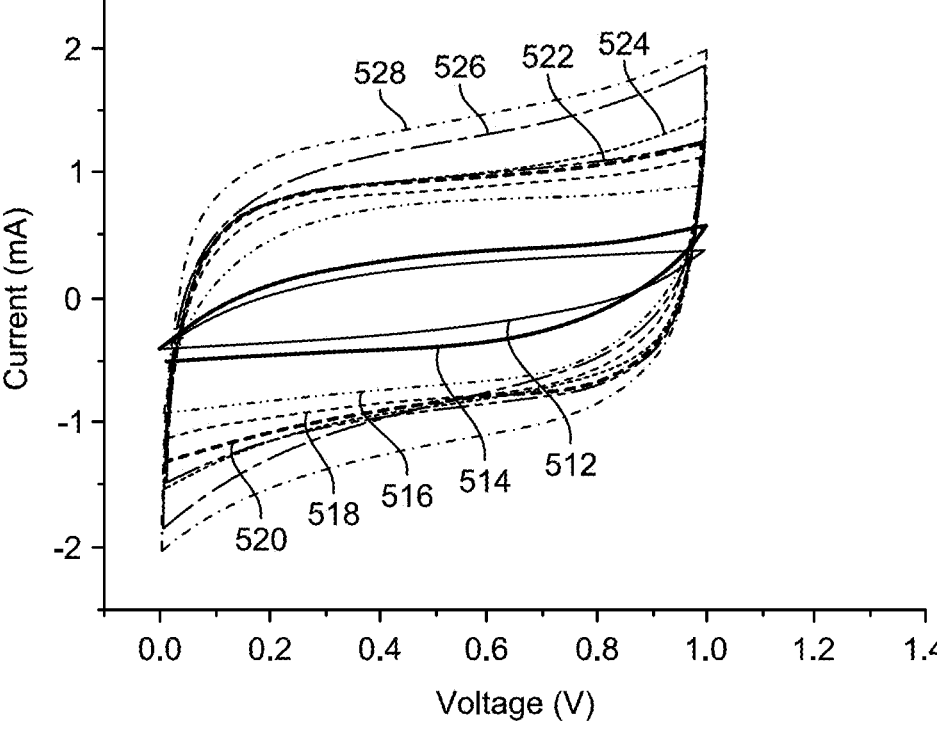
Figure 5C:
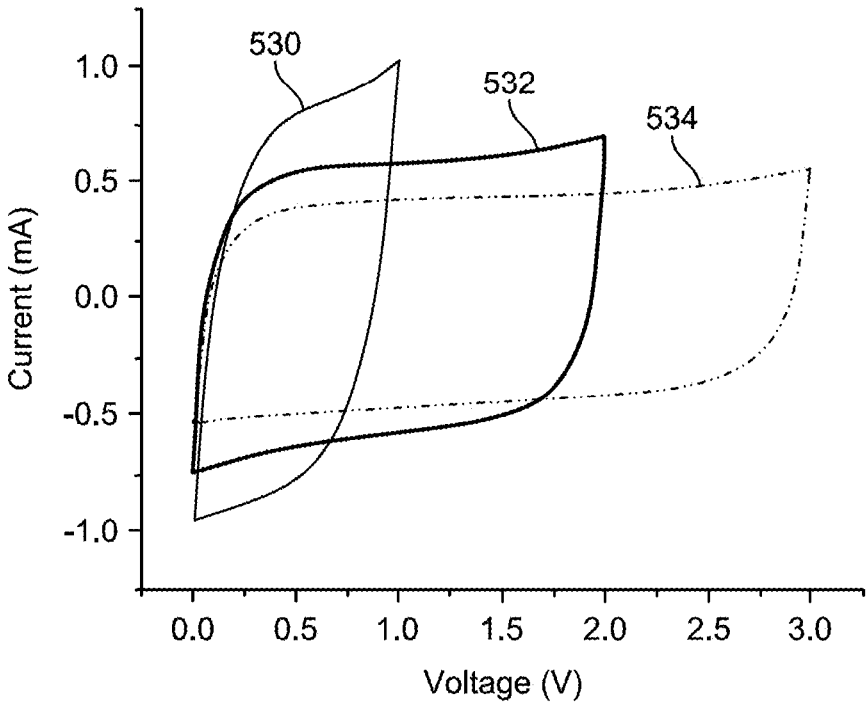
Figure 5D:
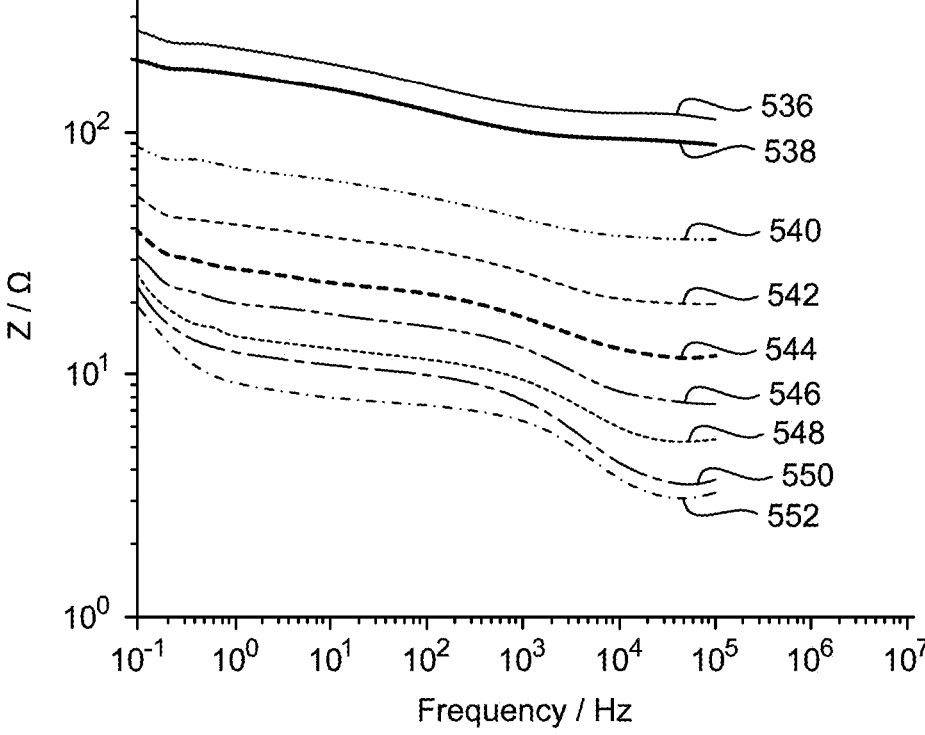
Figure 6A:
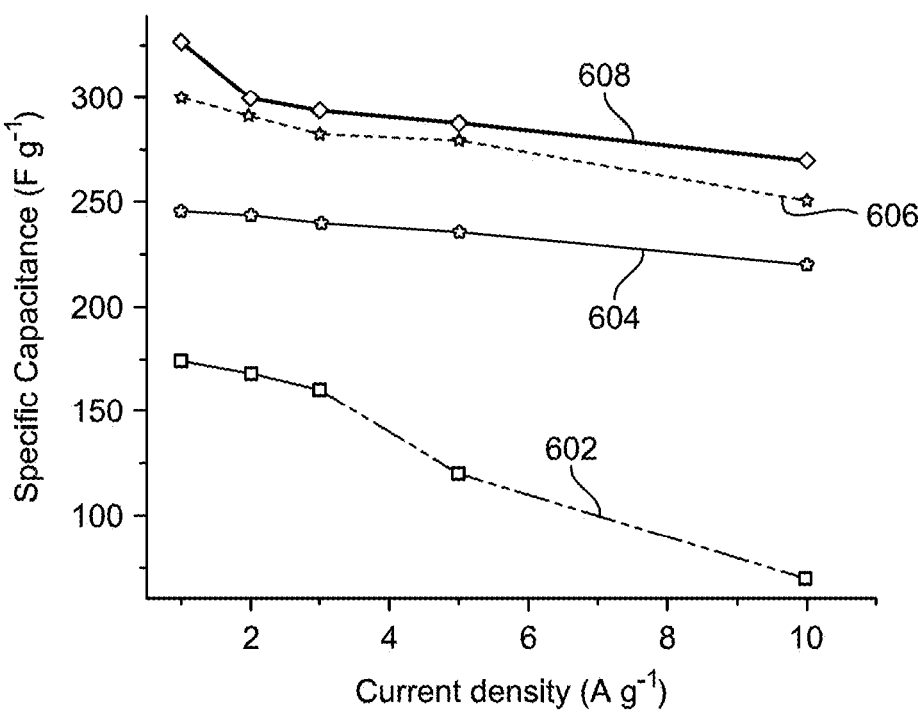
Figure 6B:
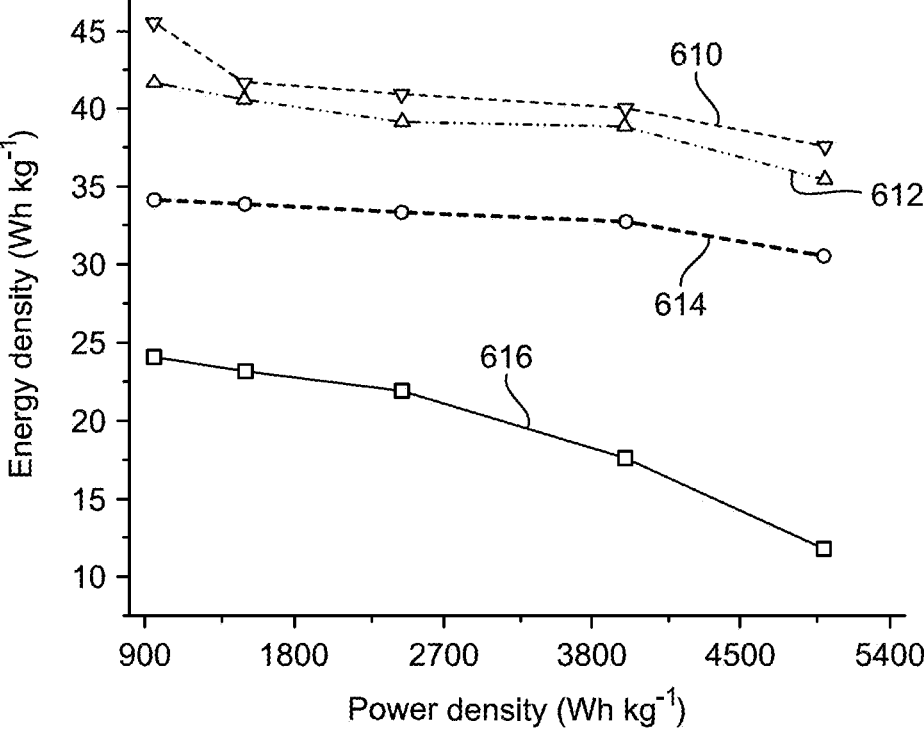
Figure 6C:
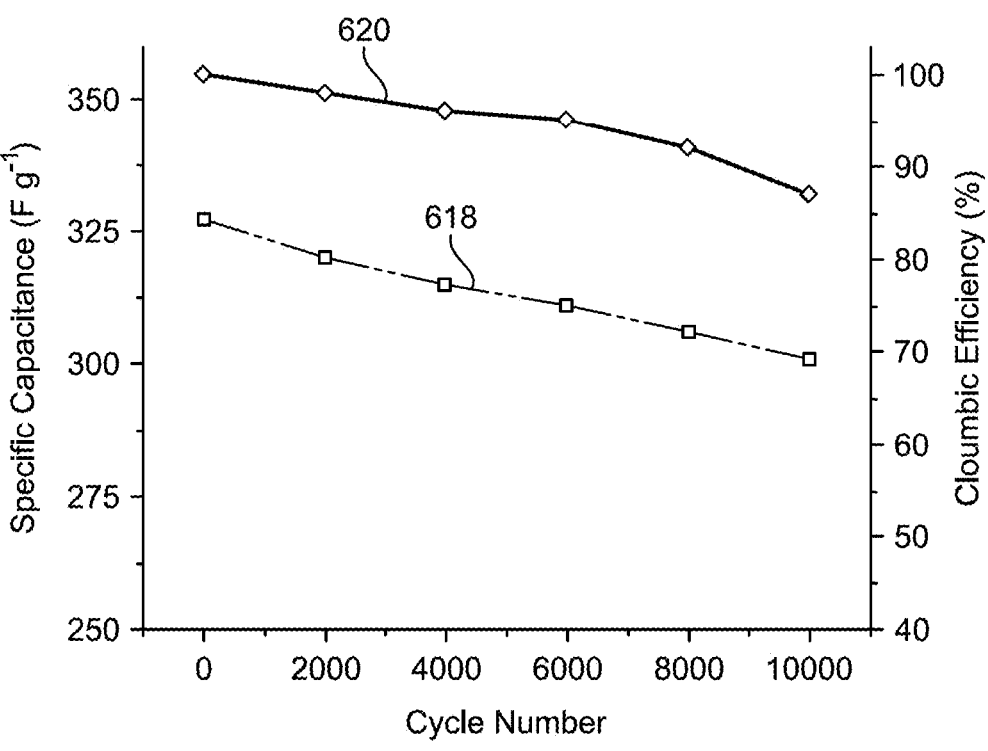
Figure 6D:
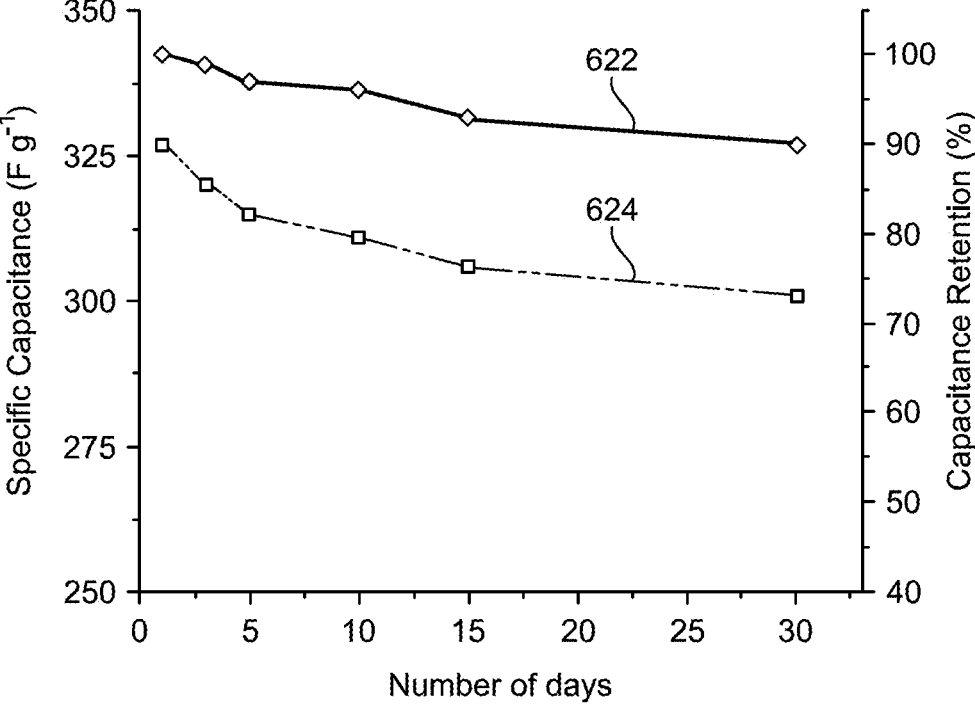
Figure 6E:
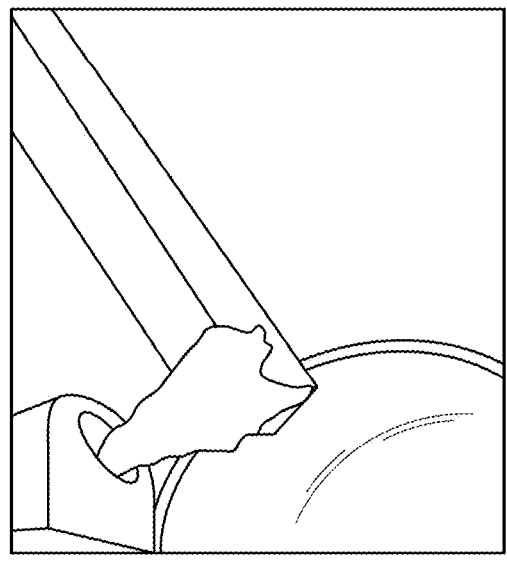
Figure 6F:
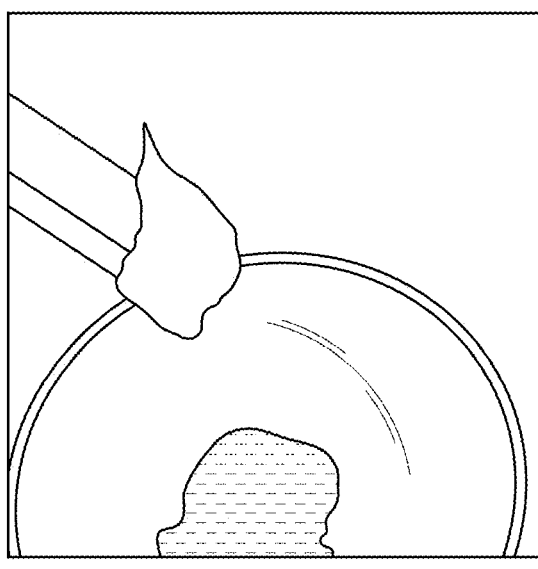
Figure 6G:
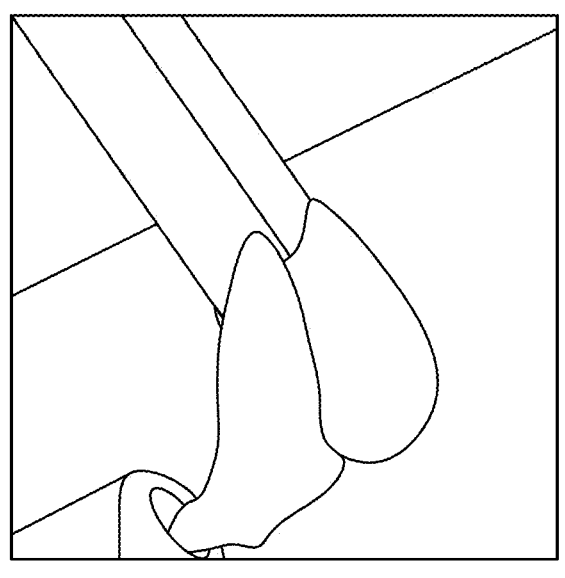
Figure 6H:
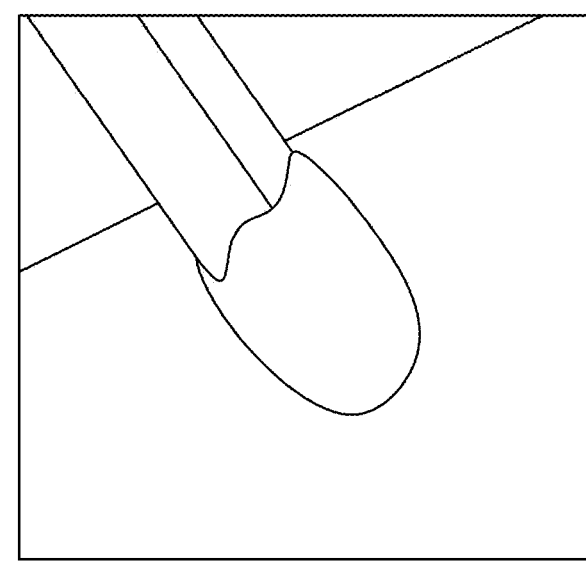

FIG. 4D illustrates the GCD curves of a Gly/3KOH/5BA based supercapacitor device at different current densities, according to certain embodiments;

FIG. 4E illustrates a comparison of the GCD curves at one milliampere (mA) current density, according to certain embodiments;

FIG. 4F illustrates the GCD profiles of Gly/3KOH/3BA at different voltages, according to certain embodiments;

FIG. 5A illustrates the CV curves of the Gly/3KOH/3BA based supercapacitor device at a potential window range of 0.8 V-2.0, according to certain embodiments;

FIG. 5B illustrates the CV curve of the supercapacitor device containing Gly/3KOH/3BA at a temperature range of 0° C.-80° C., according to certain embodiments;

FIG. 5C illustrates the CV curves of the supercapacitor device containing Gly/3KOH/3BA connected in parallel, according to certain embodiments;

FIG. 5D illustrates a temperature-dependent resistivity plot of the supercapacitor device containing Gly/3KOH/3BA, according to certain embodiments;

FIG. 6A is a specific capacitance plot of the a) Gly/3KOH/5BA, b) Gly/1KOH/5BA, c) Gly/3KOH/5BA and d) Gly/3KOH/3BA based supercapacitor devices, according to certain embodiments;

FIG. 6B illustrates a Ragone plot of the a) Gly/3KOH/5BA, b) Gly/1KOH/5BA, c) Gly/3KOH/5BA and d) Gly/3KOH/3BA based supercapacitor devices, according to certain embodiments;

FIG. 6C illustrates a cycle number of the Gly/3KOH/3BA based supercapacitor devices, according to certain embodiments;

FIG. 6D illustrates number of days of the Gly/3KOH/3BA based supercapacitor devices, according to certain embodiments;

FIGS. 6E and 6F illustrate a comparative flammability test before and after flame, respectively, for Gly/3KOH, according to certain embodiments; and FIG. 6G-6H illustrate the comparative flammability test before and after flame, respectively, for Gly/3KOH/3BA, according to certain embodiments.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "binding compound" or "binding agent" or "binder" refers to compounds or substances which holds or draws other materials together to form a cohesive whole mechanically, chemically, by adhesion or cohesion.

As used herein, "conductive additive" refers to substances or compounds or materials which when added to another substance or compound or material of low electrical conductivity, increase the conductivity thereof.

As used herein, a "voltammogram" is a graph that can be drawn after an electrochemical experiment. This graph has a typical, recognizable form in which the electron flow (current: I) is measured in Volts against the potential (E).

Embodiments of the present disclosure are directed towards a gel electrolyte for flexible energy storage devices. The gel electrolyte consisting of glycerol, boric acid (BA), and KOH, which, when used at defined weight ratios, demonstrated high ionic conductivity, chemical stability, non-flammability, electrochemical stability, and a long-life cycle. Flexible electrochemical double-layer supercapacitors (EDLC) were assembled using the gel-electrolyte of the present disclosure. The gel electrolyte of the present disclosure can be used to assemble flexible devices for wearable electronics.

In an aspect of the present disclosure, a supercapacitor is described. The supercapacitor includes two electrodes and a gel electrolyte. The gel electrolyte includes a polyol compound, a base with a molarity (M) of 1-5, preferably 1-3 M, or 1-2 M in the polyol compound, and 1-10 wt. % of boric acid (BA), preferably 1-8, or 3-5 wt. % relative to the weight of the polyol compound. The polyol compound and the base together form a first mixture. The boric acid intercalates with the first mixture to obtain the gel electrolyte. The polyol compound is preferably glycerol (Gly) or ethylene glycol, and the base is selected from a group consisting of lithium hydroxide, sodium hydroxide, and potassium hydroxide. In an embodiment, the polyol compound is glycerol, and the base is potassium hydroxide. The use of materials such as glycerol which can be created from vegetable oil, animal fat, or crude oil, improves the environmental impact and lowers the cost and the toxicity of the gel electrolyte. In an embodiment, the gel is formed through hydrogen interactions of the hydroxyl groups on the base, polyol, and boric acid. In an embodiment, the gel electrolyte does not contain water. Throughout the disclosure the gel electrolyte may be labeled as follows Polyol/M and Base/wt % and BA. For example, a gel electrolyte with glyercol, 3M KOH, and 3 wt. % BA is labeled as Gly/3KOH/3BA.

In an embodiment, the first mixture further includes at least one boronic acid-containing polymer selected from the group consisting of poly(styreneboronic acid)-β-polystyrene and poly(ethylene glycol)-β-poly(styreneboronic acid). In an embodiment, 1-15 wt. %, preferably 5-13, or 10-12 wt. % of the boronic acid-containing polymer is added to the first mixture relative to the total weight of the polymer and polyol compound.

Figure 1:
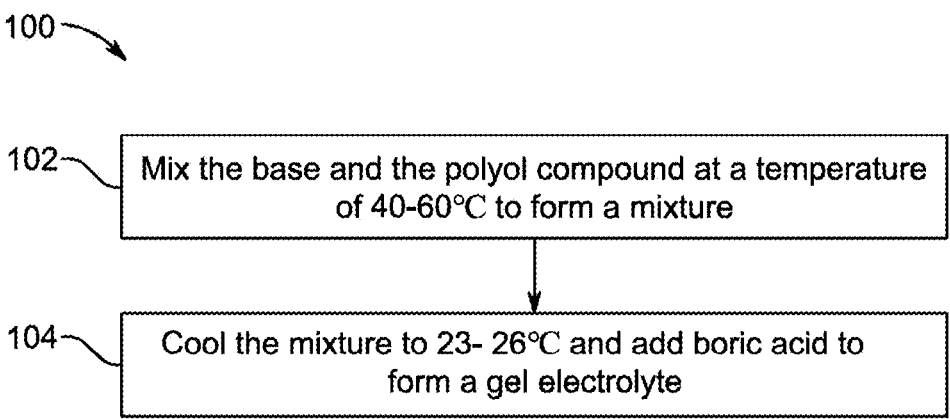
FIG. 1 is a flow chart of a method of making a gel electrolyte, according to certain embodiments of the present disclosure

Referring to FIG. 1, a flow chart of a method 100 of making the gel electrolyte is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing the base and the polyol compound at a temperature of 40-60° C., preferably 45-55, or 50° C. to form a mixture. In some embodiments, the base is selected from a group consisting of lithium hydroxide, sodium hydroxide, and potassium hydroxide. In a preferred embodiment, the base is potassium hydroxide. The base has molarity in a range of 1-5. In some embodiments, the polyol compound is glycerol. At step 104, the method 100 includes cooling the mixture to 23-26° C., preferably 24-25° C., or room temperature and adding boric acid to form the gel electrolyte. In an embodiment, the gel electrolyte includes, glycerol, potassium hydroxide, and boric acid.

In an embodiment, the gel electrolyte has a glass transition temperature of −90 to −60° C., and the gel electrolyte comprises 2-4% boric acid. In an embodiment, the gel electrolyte has a glass transition temperature of 30 to 50° C., and the gel electrolyte comprises 5-7% boric acid. The glass transition temperature increases as the percentage of BA increases, due to more interactions of the hydroxyl groups on the BA, polyol, and base. In an embodiment, the gel electrolyte has an ionic conductivity of $2\text{-}4\times10^{-3}$ S/cm, preferably $3\text{-}4\times10^{-3}$ S/cm, or $3.5\text{-}4\times10^{-3}$ S/cm. In an embodiment, the gel electrolyte produces no fire after treatment with a flame. The lack of flammability improves the overall safety of a device made with this gel electrolyte. The stability, high conductivity, and non-flammability makes the gel electrolyte of the current disclosure an ideal candidate for use in supercapacitors.

Further, each of the two electrodes in the supercapacitor includes a second mixture of 5-10 wt. % conductive additive, preferably 6-9, or 7-8 wt. %, 5-10 wt. % binding compound, preferably 6-9, or 7-8 wt. %, and 80-90 wt. % activated carbon, preferably 82-88, or 84-86 wt. % based on the total weight of the conductive additive, the binding compound, and the activated carbon.

The conductive additive allows for improved adhesion between the mixture and the electrode substrate. This intimate connection results in lower electrical resistance and, accordingly, lower impedance for the nanocomposite electrode and its associated device. In one embodiment, the conductive additive is at least one selected from the group consisting of graphite, activated carbon, reduced graphene oxide, carbon nanotubes, carbon nanofibers, and carbon black.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is selected from the group consisting of PVDF and N-methyl pyrrolidone (NMP). In an embodiment, the substrate is formed from at least one material selected from the group consisting of copper, aluminum, nickel, iron, and steel. In an embodiment, the binding compound is polyvinylidene fluoride, the conductive additive is carbon black, and the substrate is an aluminum current collector.

In an embodiment, the second mixture further includes 1-10 wt. %, preferably 1-5 wt. %, or 1-3 wt. %, of at least one boronic acid-containing polymer selected from the group consisting of poly(styreneboronic acid)-β-polystyrene, and poly(ethylene glycol)-β-poly(styrene boronic acid), based on the total weight of the conductive additive, the binding compound, the activated carbon, and the boronic acid-containing polymer.

The second mixture is at least partially coated on an inner surface of a substrate. In an embodiment, the second mixture coats at least 80% of the inner surface, preferably 90%, or 100%.

In an embodiment, the inner surface is pre-coated with at least one boronic acid-containing polymer selected from the group consisting of poly(styreneboronic acid)-β-polystyrene and poly(ethylene glycol)-β-poly(styrene boronic acid). The second mixture is coated so that an outer surface of the substrate is not coated with the second mixture. The inner surfaces of the two electrodes are separated by and in physical contact with the gel electrolyte to form the super-capacitor.

As previously described in some embodiments, at least one boronic acid-containing polymer selected from the group consisting of poly(styreneboronic acid)-β-polystyrene and poly(ethylene glycol)-β-poly(styrene boronic acid), is included in the first and/or second mixtures, and/or pre-coated on the inner surface of the supercapacitor substrate. These boronic acid containing polymers promote interaction between the gel electrolyte and the surface and/or mixture in which they are present. In an embodiment, the boronic acid containing polymer is included in the first mixture of the gel electrolyte, thereby interactions of the boronic acid in the polymer and the boric acid increase the stability and vis-cosity of the gel. In an embodiment, the boronic acid containing polymer is included in the second mixture of the supercapacitor, thereby promoting interactions of the boronic acid in the polymer and the boric acid in the gel to increase the contact surface area of the electrolyte and the activated carbon. In an embodiment, the boronic acid con-taining polymer is pre-coated on the inner surface of the of the supercapacitor substrate, thereby promoting interactions of the boronic acid in the polymer and the boric acid in the gel, which increase the contact surface area of the electro-lyte, the activated carbon and the substrate. In some embodi-ments, higher electrolyte contact surface areas improve charge transport properties.

In some embodiments, the supercapacitor of the present disclosure has a specific capacitance of 300-350 F/g at 1 A/g, preferably 310-350, or 330-350 F/g where the gel electrolyte comprises 2-4 wt. % boric acid and specific capacitance of 150-200 F/g at 1 A/g, preferably 160-200, or 180-200 F/g where the gel electrolyte includes 5-7 wt. % boric acid and 1M base. Further, the supercapacitor has at least 90%, preferably 95%, or 100% of the initial capacitance main-tained up to 10,000 cycles and after at least 30 days under ambient conditions. In some embodiments, the specific energy of the supercapacitor is 40-55 Wh/kg, preferably 45-50 Wh/kg, or 48-50 Wh/kg, at a power of 900-950 W/kg. In some embodiments, the supercapacitor has a larger spe-cific capacitance, and specific energy when the gel electro-lyte has less than 5 wt. % boric acid, due to the high ionic conductivity of this gel electrolyte composition. It was observed that activated carbon-based devices with Glycerol, 3M KOH, and 3 wt. % BA (Gly/3KOH/3BA) as the gel electrolyte have delivered exceptional capacitance of 327 F $g^{-1}$ at 1 $Ag^{-1}$ and were able to restore 93.4% of this capacitive performance after 10,000 cycles. In one embodi-ment the device has a specific energy of 45.4 W·h $kg^{-1}$ at a power of 920 W $kg^{-1}$.

In some embodiments, the supercapacitor has an open voltage window of 0-3 V. The stability of the gel electrolyte of the present disclosure allows for the supercapacitor to be operated across a wide voltage window without degradation.

In an embodiment, 2-10 supercapacitors can be connected in parallel or in series. In some embodiments, the superca-pacitors show an equivalent series resistance of 4-8Ω, pref-erably 4-7, or 4-6Ω. The low series resistance resulting from the high electrical conductivity and contact area between the activated carbon layer and the current collector.

In an aspect of the present disclosure, a wearable device includes the supercapacitor electrically connected to a sensor, and the supercapacitor functions like a battery. Using a gel electrolyte, such as that of the present disclosure, allows for the supercapacitors to be flexible and thereby incorpo-rated into wearable devices.

EXAMPLES

The following examples describe and demonstrate exem-plary embodiments of a gel electrolyte in a supercapacitor as described herein. The examples are provided solely for the purpose of illustration and are not to be construed as limitations of the present disclosure, as many variations thereof are possible without departing from the spirit and scope of the present disclosure.

Materials Used

Conductive additive for Li-ion batteries (Timical™ super C65) (CC), HSV 900 PVDF (polyvinylidene fluoride) binder for Li-ion battery electrode, and 2-Kuraray active carbon for supercapacitor electrode (AC) were purchased from MTI Corp™, Potassium hydroxide (KOH) pellets, boric acid ($H_3PO_3$) and glycerol were supplied by Sigma Aldrich™, (NMP) 1-methyl-2-pyrrolidone was purchased from Merck™.

Example 1: Preparation of Gel Electrolytes and Electrode

Anhydrous gel electrolytes of Gly/KOH/BA were pre-pared for the supercapacitor. For this purpose, KOH (1M, and 3M) prepared at different concentrations were dissolved in glycerol at 50° C. until it was homogeneous and trans-parent to obtain a Gly/KOH electrolyte. The Gly/KOH electrolyte, after cooling, was doped with BA in fractions of 3% and 5% by weight relative to Gly. The resulting mixture, which formed a jelly-like solution (abbreviated as Gly/XKOH/YBA with X=1 and 3 M, Y=3 and 5% w/w) was poured dropwise onto the electrodes. The electrode synthe-sis was based on 10% CC, 10% PVDF, and 80% activated carbon (CA).

Example 2: Experimental Evaluation

The FT-IR spectra analysis of Gly/XKOH/YBA was per-formed in the range of 400-4000 $cm^{-1}$ using Perkin Elmer Spectrum Two™. Glass transition temperatures of the elec-trolytes were investigated using DSC, Hitachi™ DSC 7000X. The samples were treated at a heating rate of 10° C. $min^{-1}$ under an inert atmosphere. CV and EIS studies were obtained from the electrochemical workstation (PalmSens EmStat 4). GCD electrochemical measurements of the pre-pared cells were performed using an MTI battery analyzer (1-5 mA and up to 2 V).

Results and Discussion

Figure 2A:
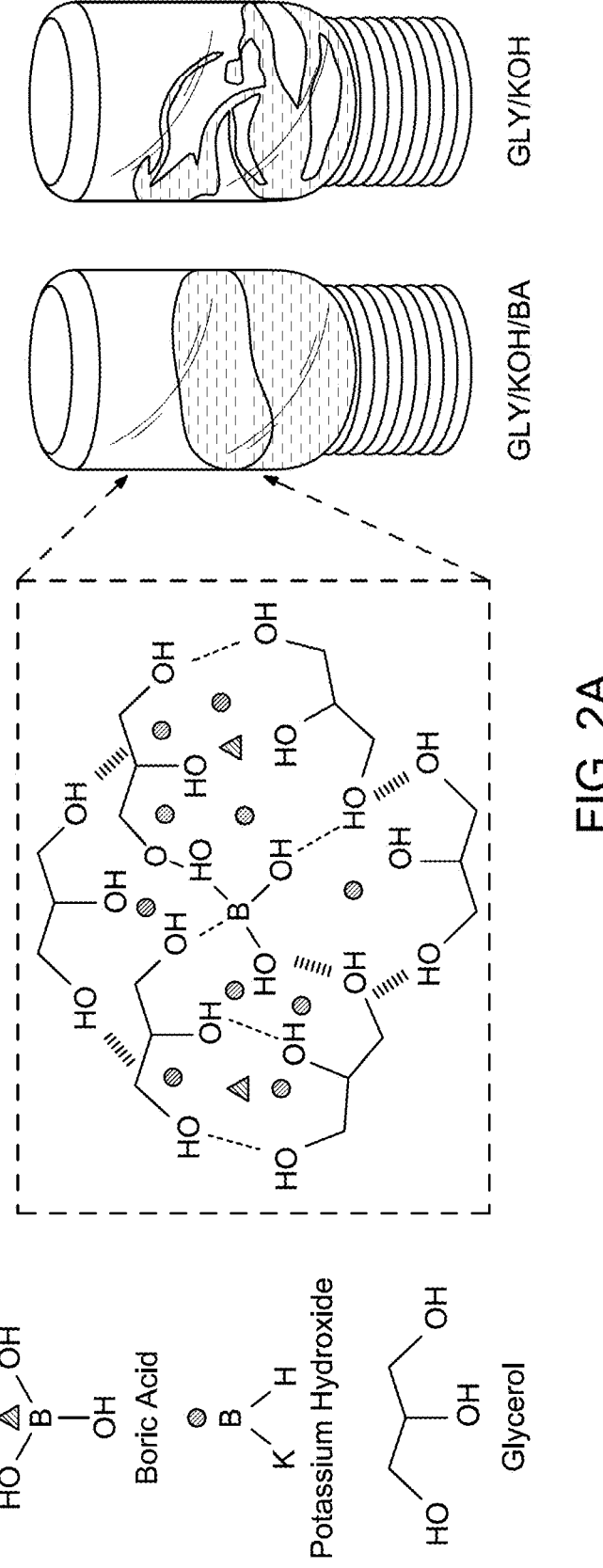
FIG. 2A is a pictorial image of an anhydrous electrolyte (glycerol and KOH) with and without boric acid (BA), according to certain embodiments.
Figure 2B:
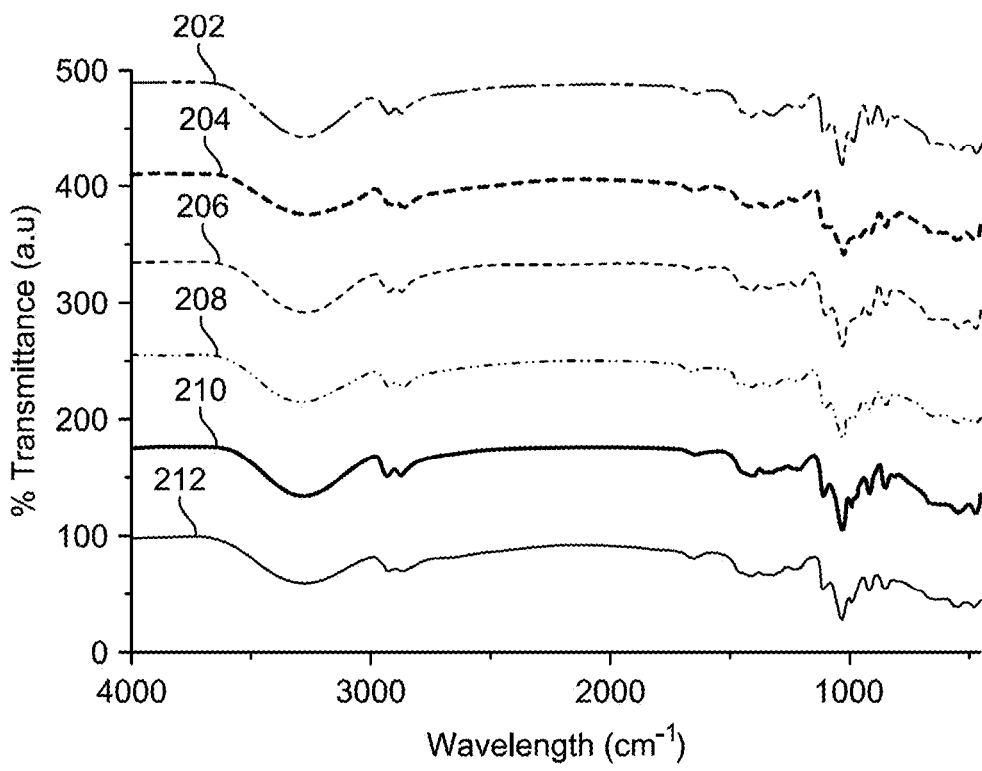
FIG. 2B illustrates a Fourier Transform Infra-Red (FT-IR) spectra of electrolytes at various doping ratios, according to certain embodiments.

General structures of glycerol, KOH, and boric acid (BA) along with a pictorial image of glycerol with and without KOH/BA are demonstrated in the FIG. 2A. From the FIG. 2A it can be observed that glycerol with KOH/BA exhibits that the intercalation of BA increased the strength of the gel (FIG. 2A). This is because glycerol reacts with the boric acid to form a complex structure, and hence, ion mobility occurs along with the structure. The FT-IR spectra of the Gly/XKOH/YBA are illustrated in FIG. 2B. Six trend lines can be observed in the FIG. 2B. A first trend line (202) corresponds to Gly/3KOH, a second trend line (204) corresponds to Gly/1KOH/3BA, a third trend line (206) corresponds to Gly/3KOH/3BA, a fourth trend line (208) corresponds to Gly/1KOH/5BA, a fifth trend line (210) corresponding to Gly/3KOH/5BA, and a sixth trend line (212) corresponding to Gly/1KOH. The absorption of pure Gly is displayed at 1149-928 cm$^{-1}$ that belongs to C—O stretching, and the band at 3000-2850 cm$^{-1}$ can be assigned to C—H stretching. The peaks at 1350-1450 cm$^{-1}$ and 3450 cm$^{-1}$ can be attributed to C—H and O—H vibrations, respectively. The absorption peak obtained at 1002 cm$^{-1}$ disappeared. In addition, the peak cantered at 1030 cm$^{-1}$ was broadened after doping boric acid, which can be attributed to the complexation Gly with BA.

Figure 2C:
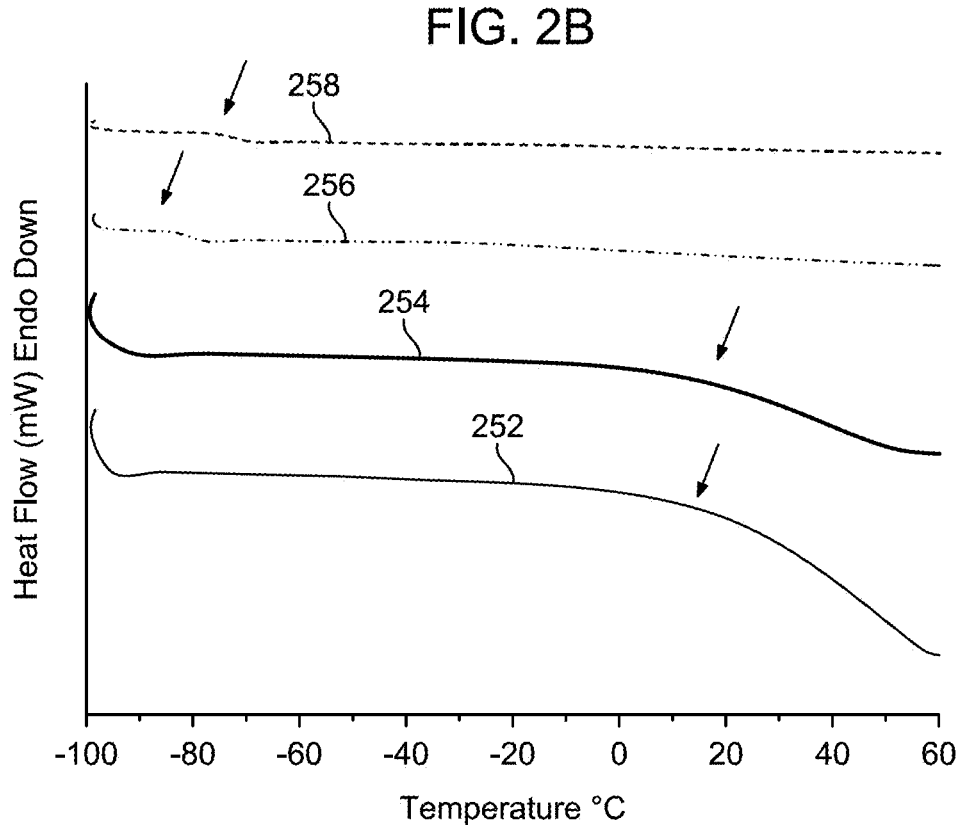
FIG. 2C illustrates Differential Scanning Colorimetric (DSC) profiles of the electrolytes at various doping ratios, according to certain embodiments

The DSC studies of Gly/KOH/BA-based anhydrous electrolytes were evaluated, and results are presented in FIG. 2C. Four trend lines can be observed from the FIG. 2C. A first trend line (252) corresponds to Gly/1KOH/5BA, a second trend line (254) corresponds to Gly/3KOH/5BA, a third trend line (256) corresponds to Gly/1KOH/3BA, and a fourth trend line (258) corresponds to Gly/3KOH/3BA. The gel electrolytes with lower BA content, such as Gly/1KOH/3BA (256) and Gly/3KOH/3BA (258), have Tg of –81° C. and –71° C., respectively. In contrast, the Tg of the bio electrolytes, Gly/1KOH/5BA (252) and Gly/3KOH/5BA (254), shifted to corresponding higher temperatures of 37.4° C. and 40.3° C., respectively. As the BA content increases, the Tg of the samples shifted to higher temperatures confirming the complex formation as illustrated in the FIG. 2C.

Figure 3A:
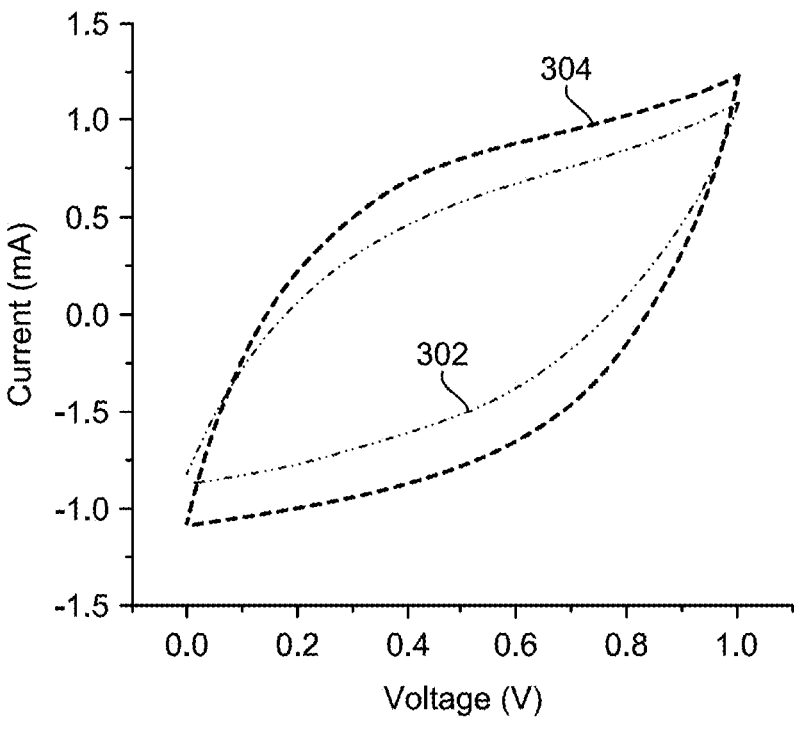
FIG. 3A shows a cyclic voltammogram (CV) profile of the anhydrous electrolyte in a potential range of 0-1 V at a scan rate of 10 mV s$^{-1}$, according to certain embodiments.
Figure 3B:
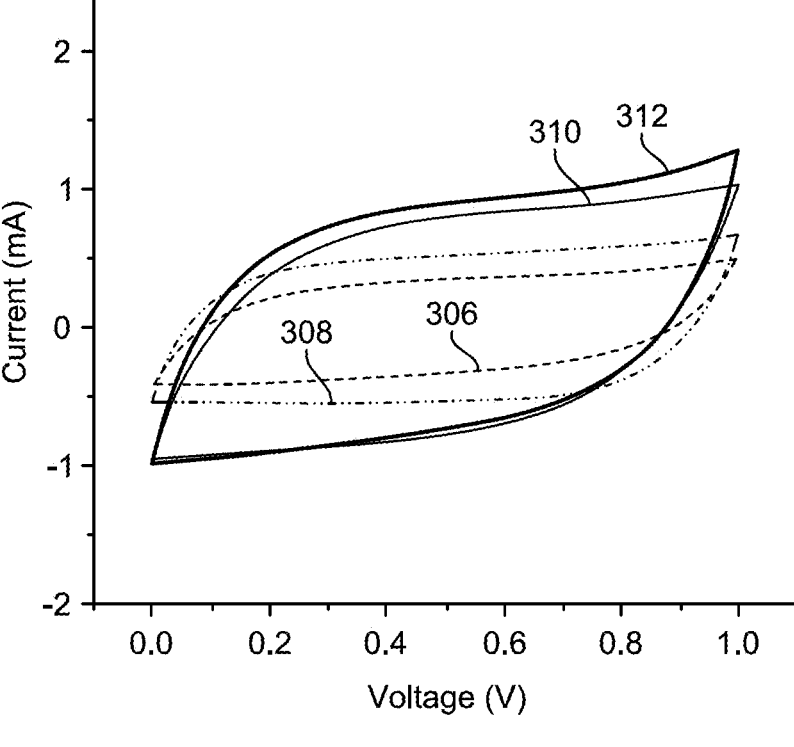
FIG. 3B shows CV profiles of the anhydrous electrolytes, namely a) Gly/3KOH/3BA, b) Gly/1KOH/3BA, c) Gly/1KOH/5BA, and d) Gly/3KOH/5BA in a potential range of 0-1 V at a scan rate of 10 mV s$^{-1}$, according to certain embodiments.
Figure 3C:
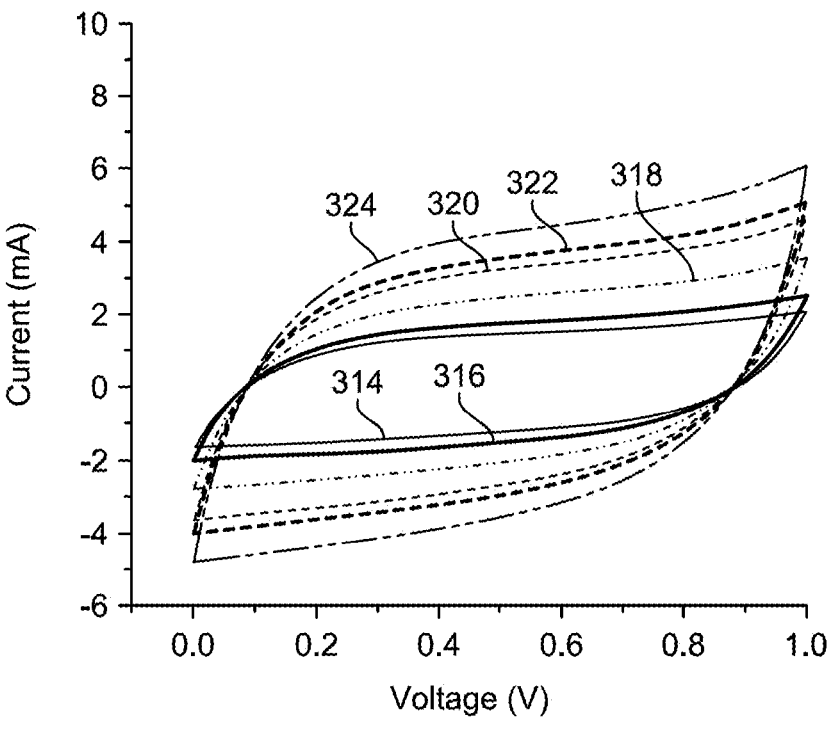
FIG. 3C shows the CV of Gly/3KOH/3BA at different scan rates ranging from 10-200 mV s$^{-1}$, according to certain embodiments.

The electrochemical stability of the supercapacitor devices with various gel electrolytes was investigated, and the results of this study are depicted through the FIGS. 3A through 3D. These figures demonstrate the CVs of the supercapacitors, including different electrolytes (Gly/XKOH/YBA), at a potential range of 0-1 V over a scan rate of 10 mV s$^{-1}$. The CV profiles of the Gly/1KOH (302) and Gly/3KOH (304) can be observed in the FIG. 3A completely diverges from the ideal rectangular form. FIG. 3B shows CV profiles of the anhydrous electrolyte (Gly/3KOH/3BA, Gly/1KOH/3BA, Gly/1KOH/5BA, and Gly/3KOH/5BA) in a potential range of 0-1 V at a scan rate of 10 mV s$^{-1}$. Four trend lines can be observed in the FIG. 3B. A first trend line 306 corresponds to Gly/3KOH/5BA, a second trend line (308) corresponds to Gly/1KOH/5BA, a third trend line 310 corresponds to Gly/1KOH/3BA, and a fourth trend line (312) corresponds to Gly/3KOH/3BA. Generally, it can be observed that the CV voltammograms of Gly/XKOH/YBA show a quasi-rectangular form within wide operating potential windows. This behavior refers to a superior capacitive of the Gly/XKOH/YBA that essentially creates from the charge and discharge of an EDLC and due to the capacitance stored by the aggregation of electrolyte ions at the electrode-electrolyte contact. Interestingly, the peaks of oxidation and reduction are absent, which indicates the electrochemical stability of the Gly/XKOH/YBA systems and energy storage over EDLC. The current increases with a decrease in the BA ratio of the electrolyte, while the effect of KOH is not strong. The highest current was observed with Gly/3KOH/3BA electrolyte (312), indicating that Gly/3KOH/3BA (312) based supercapacitor device enhances the current (1.3 mA) in comparison to the Gly/3KOH/5BA (308) based supercapacitor device (0.49 mA) measured with a scan rate of 10 mV s$^{-1}$. Thus, the Gly/3KOH/3BA (312) raises the charge storage capacity of the device.

The specific capacitance of the device with Gly/3KOH/3BA (312) was evaluated with a gradual increase in the scan rate to 200 mVs$^{-1}$. The results of this study are presented in the FIG. 3C. From the FIG. 3C, six trend lines can be observed. A first trend line (314) refers to the Gly/3KOH/5BA based supercapacitor device (0.49 mA) measured with a scan rate of 10 mV s$^{-1}$, a second trendline (316) refers to the Gly/3KOH/5BA based supercapacitor device (0.49 mA) measured with a scan rate of 20 mV s$^{-1}$, a third trend line (318) refers to the Gly/3KOH/5BA based supercapacitor device (0.49 mA) measured with a scan rate of 50 mV s$^{-1}$, a fourth trend line (320) refers to the Gly/3KOH/5BA based supercapacitor device (0.49 mA) measured with a scan rate of 100 mV s$^{-1}$, a fifth trend line (322) refers to the Gly/3KOH/5BA based supercapacitor device (0.49 mA) measured with a scan rate of 150 mV s$^{-1}$, and a sixth trend line (324) refers to the Gly/3KOH/5BA based supercapacitor device (0.49 mA) measured with a scan rate of 200 mV s$^{-1}$. A gradual reduction capacitance was noticed when the scan rate raised to 200 mV s$^{-1}$, which can be explained by the porous carbon components layers' fast ion diffusion restrict double-layer development.

Figure 3D:
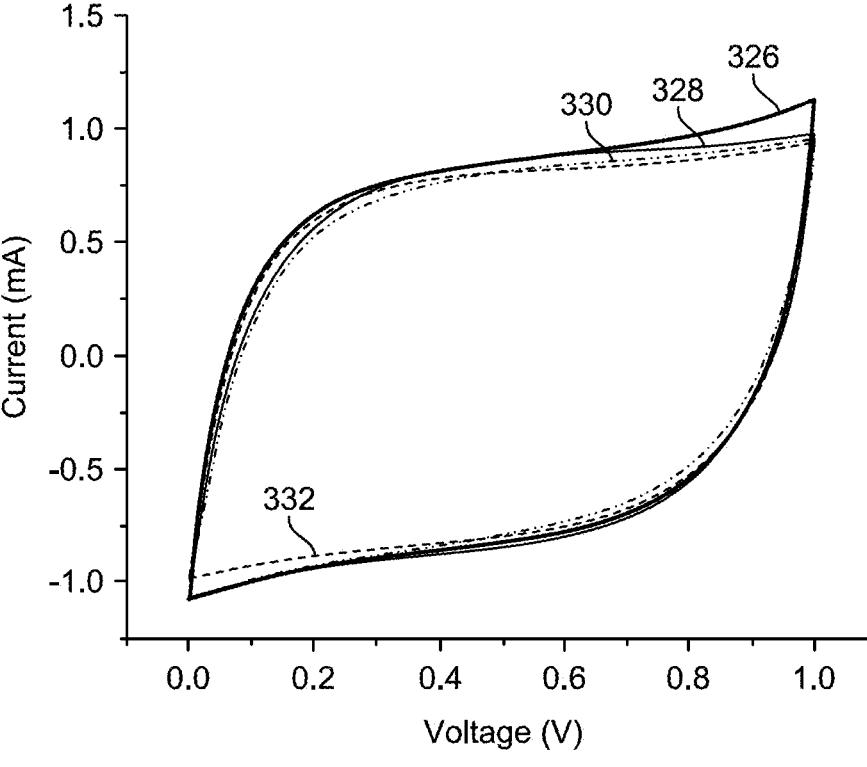
FIG. 3D depicts the CV of Gly/3KOH/3BA on different days, according to certain embodiments.
Figure 3E:
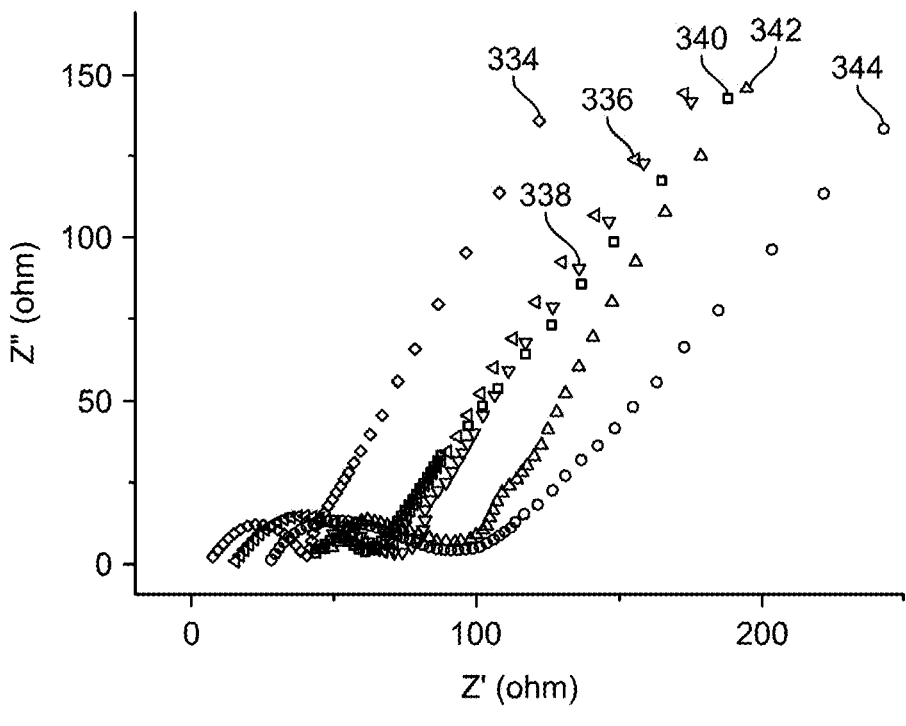
FIG. 3E illustrates electrochemical impedance spectroscopy (EIS) curve of supercapacitor devices with different electrolytes Gly/1KOH, Gly/3KOH, Gly/1KOH/3BA, Gly/1KOH/5BA, Gly/3KOH/3BA and Gly/3KOH/5BA, according to certain embodiments.
Figure 3F:
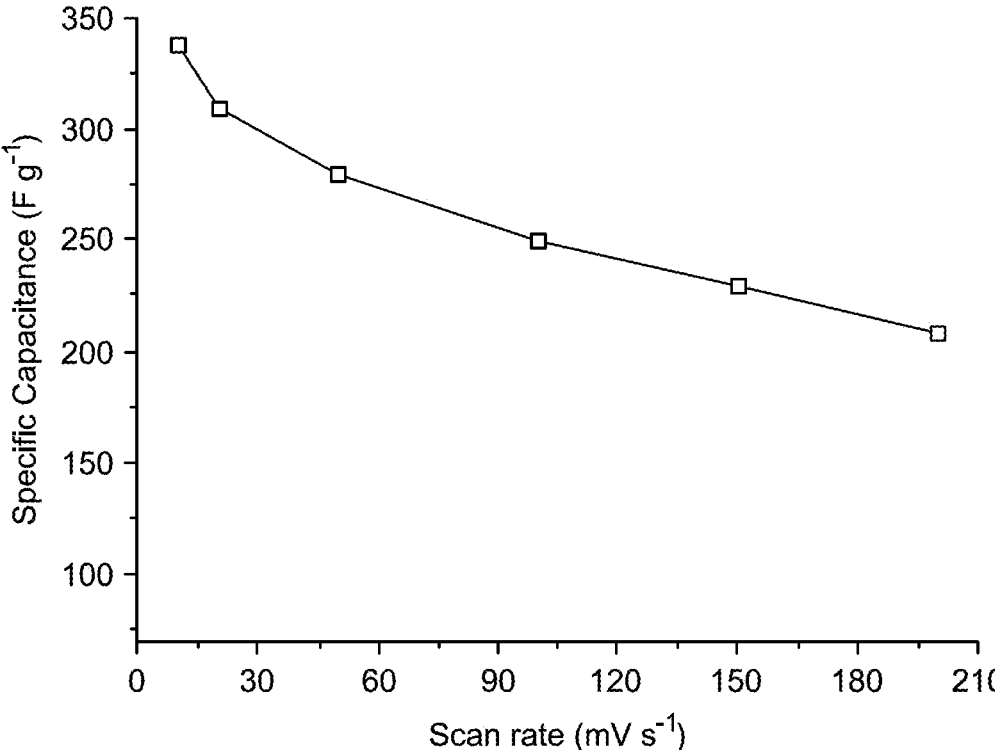
FIG. 3F illustrates electrolyte resistivity of the different electrolytes Gly/1KOH, Gly/3KOH, Gly/1KOH/3BA, Gly/1KOH/5BA, Gly/3KOH/3BA, and Gly/3KOH/5BA, according to certain embodiments.

The time-dependent performance of the device with Gly/3KOH/3BA was tested by the CV measurement as shown in FIG. 3D. The study was performed for four days (96 hours). Four trend lines can be observed in the FIG. 3D. A first trendline (326) refers to the performance of the device with Gly/3KOH/3BA after 24 hours, a second trendline (328) refers to the performance of the device after 48 hours, a third trend line (330) refers to the performance of the device after 72 hours, and a fourth trendline (332) refers to the performance of the device after 96 hours. The device has a remarkable capacitance that maintains the performance even after 96 hours with almost no loss. Electrochemical performance, including electrolyte resistance and charge resistance, was investigated using EIS. The results of this study are depicted in the FIG. 3E. FIG. 3E shows the Nyquist plots of all the Gly/XKOH/YBA and the comparable circuit design. The devices' equivalent series resistance (ESR) was calculated by intersecting the Z' axis as listed in Table 1.

TABLE 1

| ESR and Rct of the Gly/XKOH/YBA supercapacitors. | | | |
|---|---|---|---|
| Trendline (FIG. 2E) | Device | ESR (Ω) | Rct (Ω) |
| 340 | Gly/1KOH | 28.8 | 33.9 |
| 344 | Gly/3KOH | 27.7 | 65.1 |
| 342 | Gly/1KOH/3BA | 45.6 | 45.4 |
| 338 | Gly/1KOH/5BA | 38.8 | 31.5 |
| 334 | Gly/3KOH/3BA | 6.2 | 33.2 |
| 336 | Gly/3KOH/5BA | 16.3 | 48.7 |

Six trendlines can be observed from the FIG. 3E, the details corresponding to which are presented in Table 1. The low ESR value of the Gly/3KOH/3BA (334) device (6.5Ω) could be attributed to the high electrical conductivity and the contact area between the activated carbon layer and the current collector, which significantly serves practical applications. All curves had a straight line at the low frequency, indicating ion transport into the carbon electrode structure throughout the pores in the surface of the electrodes, known as Warburg impedance. This region demonstrates a characteristic performance of a double-layer reaction-based supercapacitor, which increases sharply and is almost parallel to the Z-axis, representing the dominance of double-layer reaction over pseudocapacitive capacitance. Thus, the charge-discharge performance of the device can be enhanced. The curves show a semi-circle in the middle-frequency region, indicating the feature of a single "time constant" attributed to charge transfer resistance (Rct) at the electrode/electrolyte interface. A low Rct value represents a high response proportion. From the diameter of the semicircle, the Rct was calculated in Table 1. In high frequency, compared to the highest Rct value (65.1Ω) which is related to the Gly/3KOH (344), doping Gly/1KOH (340) electrolyte with BA in fractions of 5% by weight relative to Gly significantly decreased the Rct of the symmetrical supercapacitor to almost the half (the lowest Rct, 31.5Ω). Therefore, the Gly/1KOH/5BA (338) system has the highest ion diffusions on the electrode surface.

GCD test of the fabricated supercapacitors was performed in a potential window of 1000 mV at different current densities as presented in FIGS. 4A-4E. FIGS. 4A-4D depicts the GCD curves for the electrolytes Gly/3KOH/5BA, Gly/1KOH/5BA, Gly/3KOH/5BA, and Gly/3KOH/3BA based supercapacitor devices, respectively, at different current densities. To test the performance of the electrolyte at different current values, five constant current values were analyzed, ranging from 1 mA to 5 mA, particularly at 1 mA (402), 2 mA (404), 3 mA, (406), 4 mA (408), and 5 mA (410), respectively. FIG. 4A represents the GCD of the Gly/3KOH/5BA electrolyte. From the FIG. 4A it can be observed that charging time was higher, particularly at lower current values such as 1 mA (402), 2 mA (404), and 3 mA (406) compared to discharging time indicating low capacitance. Similarly, FIG. 4B shows the GCD analysis of Gly/1KOH/5BA electrolyte at 1 mA (412), 2 mA (414), 3 mA, (416), 4 mA (418), and 5 mA (420), respectively. The results indicate that the discharging time of this electrolyte was slightly higher in comparison to the Gly/3KOH/5BA electrolyte.

Further analysis reveals that as the molarity of the KOH is increased, the specific capacitance shows an increasing trend, as given in the FIGS. 4C-4D for Gly/3KOH/5BA, and Gly/3KOH/3BA based supercapacitor devices, respectively. The performance of the Gly/3KOH/5BA electrolyte at different current values, particularly at 1 mA (422), 2 mA (424), 3 mA, (426), 4 mA (428), and 5 mA (430), was analyzed. Similarly, the performance of the Gly/3KOH/3BA electrolyte at different current values, particularly at 1 mA (432), 2 mA (434), 3 mA, (436), 4 mA (438), and 5 mA (440), was also analyzed. According to the CV study, Gly/3KOH/3BA was excellent and performed very well in GCD analysis, at very low current values, such as 1 mA as well. The discharging time was much longer than the other electrolytes with the Gly/3KOH/3BA electrolyte.

Furthermore, a comparative GCD analysis is presented in the FIG. 4E for all electrolytes, namely Gly/3KOH/3BA (442), Gly/1KOH/3BA (444), Gly/1KOH/5BA (446), Gly/3KOH/5BA (448), Gly/3KOH (450), and Gly/1KOH (452) at a low discharging current of 1 mA. At one mA, the highest specific capacitance of 327 F g$^{-1}$ is achieved for Gly/3KOH/3BA (442). The results were comparable with Gly/1KOH/3BA (454). FIG. 4F represents the GCD profiles of the Gly/3KOH/3BA at different voltages, namely 2.0 V (454), 1.5 V (456), 1.2 V (458), 1.0 V (460), and 0.8 V (462) across a potential window. The charge-discharge time of this electrolyte was found to be best at 2.0 V (454), as can be observed in the FIG. 4E.

To determine the stable potential window of the Gly/3KOH/3BA based device, CV curves (FIG. 5A) were studied at various working potentials ranging from 0.8 V to 2.0 V, namely 2.0 V (502), 1.5 V (504), 1.2 V (506), 1.0 V (508), and 0.8 V (510). No significant change was observed in current densities of different operating potential windows, which depicts that the Gly/3KOH/3BA based supercapacitor device is relatively stable at different voltages and can be reversibly cycled.

FIG. 5B shows the temperature-dependent electrochemical performance of the Gly/3KOH/3BA based device using CV. For this purpose, the study was performed at a temperature range of 0-80° C., particularly at 0° C. (512), 10° C. (514), 20° C. (516), 30° C. (518), 40° C. (520), 50° C. (522), 60° C. (524), 70° C. (526) and 80° C. (528). It was found that the area covered under CV curves continued to increase with increasing temperature, reflecting enhanced charge storage capacity of the device at elevated temperatures. Supercapacitors are commonly connected in parallel for systems demanding elevated current densities to enhance the net capacitance. Therefore, a combination of parallel supercapacitors are used to obtain maximized operating potential. Considering this combination, two and three sets of Gly/3KOH/3BA based supercapacitor devices were connected in parallel (FIG. 5C). It was observed that the output potential of the two parallel-connected devices was doubled (530) compared to the single device (532) and approximately tripled with three devices (534), hence indicating an increase in capacitance.

Further, the temperature stability of the Gly/3KOH/3BA based device was investigated by frequency (Hz) vs. resistance (ohm) measurement as shown in FIG. 5D. For this purpose, the study was performed at a temperature range of 0-80° C., particularly at 0° C. (536), 10° C. (538), 20° C. (540), 30° C. (542), 40° C. (544), 50° C. (546), 60° C. (548), 70° C. (550) and 80° C. (552). From the FIG. 5D, it can be observed that temperature affects the device resistivity more noticeably at lower frequency values (<10 Hz) than higher values. Due to device characteristics such as higher viscosity and lower ionic conductivity, resistivity values were higher at lower temperatures and lower frequencies. At the same time, minor changes occurred at frequencies over 10 Hz.

FIG. 6A depicts the specific capacitances (Cs) of prepared supercapacitors, determined against varying current densities of 1 A·g$^{-1}$, 2 A·g$^{-1}$, 3 A·g$^{-1}$, 5 A·g$^{-1}$, and 10 A·g$^{-1}$ to indicate the rate capability of devices. The Cs was evaluated using the following Eq. (1);

$$C_s = 2I\Delta T/w\Delta V \qquad (1)$$

Where I, ΔT, w and ΔV ccorrespond to the discharge current, discharge time, mass of the active material on the electrode, and discharge potential window, respectively. The supercapacitor with the electrolyte Gly/3KOH/5BA (602) shows a Cs of 175 F·g$^{-1}$ whereas, for other fabricated supercapacitors (Gly/1KOH/5BA (604), Gly/1KOH/3BA (606), and Gly/3KOH/3BA (608)), maximum Cs values observed were 250 F·g$^{-1}$, 300 F·g$^{-1}$ and 327 F·g$^{-1}$ at a current density of 1 A·g$^{-1}$, respectively. Hence, the maximum improvement in Cs was obtained with 3% BA to the electrolyte. FIG. 6B displays the energy and power density performances of all fabricated supercapacitors calculated from GCD profiles using the following Eq. (2) and (3), respectively.

$$E = 1/2 \times C_s \times \Delta V^2/3.6 \qquad (2)$$

$$P = 3600 \times E/\Delta t \qquad (3)$$

Where, E and P represent energy density and power density, respectively. Among all supercapacitor devices, namely Gly/3KOH/3BA (610), Gly/1KOH/5BA (612), Gly/1KOH/3BA (614), and Gly/3KOH/5BA (616). Gly/3KOH/3BA (610) showed a maximum energy density of 45.4 W·h kg$^{-1}$ at the corresponding power density of 950 W kg$^{-1}$. However, a slight decline was observed to 40.1 W·h kg$^{-1}$ at a power density of 5000 W kg$^{-1}$. This indicates that the device provides excellent performance at high discharge currents. The cyclic charge-discharge performance of the Gly/3KOH/3BA based device was tested by applying 10,000 GCD cycles at 1 A g$^{-1}$ current density. The device's calculated specific capacitance (618) and coulombic efficiency (620) are displayed in the FIG. 6C. Excellent cyclic stability of the device was observed until 4000 cycles by retaining around 97% of its initial capacitance (327 F g$^{-1}$), indicating excellent cyclic stability. However, after 4000 cycles, a decline in capacitance was observed till 10000 cycles, which may be due to the accumulation of the electrode material and fall in adhesion between electrode materials and current collector. In FIG. 6D, it is shown that the GCD profile of the Gly/3KOH/3BA based supercapacitor maintains its high performance even after 30 days, retaining around 90% (capacitance retention (622) of its initial capacitance (624). For the safety of the energy storage device, non-flammability is a significant criterion. In FIGS. 6E-6H, a comparative flame test was performed for Gly/3KOH and boron-doped Gly/3KOH/3BA non-aqueous electrolytes. From the FIGS. 6E-6H, it can be confirmed that Gly/3KOH catches fire and continues burning; on the other hand, Gly/3KOH/3BA produces no fire after flame treatment.

The fabrication and application of the gel bio-electrolytes of the present disclosure, BA doped Gly/KOH, was performed. The electrolyte's physiochemical properties depend on the BA content where the T$_g$ shifted to higher temperatures, increasing the mechanical properties. Quasi-solid-state electrical double-layer capacitors were assembled using Gly/XKOH/YBA electrolytes and AC electrodes. The optimum electrolyte composition obtained was Gly/3KOH/3BA, which afforded non-flammability and high ionic conductivity of 2.9×10$^{-3}$ S·cm$^{-1}$. A series of devices were constructed using electrolytes with various BA contents. Consequently, the high specific capacitance of 81.57 F·g$^{-1}$ at 1.0 A·g$^{-1}$ was obtained in a potential window of 0-3.0 V for Gly/3KOH/3BA. The specific energy of 45.4 Wh·kg$^{-1}$ was yielded at a specific power of 950 W kg$^{-1}$. The resulting supercapacitor is robust and displayed 10,000 cycles by maintaining its 93.4% initial performance. Hence, the supercapacitor with BA doped Gly/KOH has a flexible character, eco-friendly, non-flammable, and cost-effective, and, therefore, can be suggested for wearable electrochemical storage devices.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A gel electrolyte supercapacitor, comprising:
two electrodes; and
a gel electrolyte;
wherein the gel electrolyte comprises:
a polyol compound that is selected from the group consisting of glycerol and ethylene glycol;
a base with a molarity (M) of 1-5 in the polyol compound; and 1-10 wt % of boric acid relative to the weight of the polyol compound;
wherein the boric acid intercalates with a first mixture of the polyol compound and the base, creating a gel;
wherein
the base is selected from a group consisting of lithium hydroxide, sodium hydroxide, and potassium hydroxide;
wherein the two electrodes each comprise:
a second mixture comprising 5-10 wt % of a conductive additive, 5-10 wt % of a binding compound, and 80-90 wt % of an activated carbon, based on the total weight of the conductive additive, the binding compound, and the activated carbon; and
wherein the second mixture is at least partially coated on an inner surface of a substrate, wherein the substrate is formed from at least one material selected from the group consisting of copper, aluminum and nickel;
wherein an outer surface of the substrate is not coated with the second mixture; and
wherein the inner surfaces of the two electrode substrates are separated by and in physical contact with the gel electrolyte to form the gel electrolyte supercapacitor.

2. The gel electrolyte supercapacitor of claim 1, wherein the polyol compound is glycerol; and
the base is potassium hydroxide.

3. The gel electrolyte supercapacitor of claim 1, wherein the gel electrolyte has
a glass transition temperature of −90 to −60° C.;
wherein the gel electrolyte comprises 2-4 wt % boric acid.

4. The gel electrolyte supercapacitor of claim 1, wherein the gel electrolyte has
an ionic conductivity of 2×10$^{-3}$-4×10$^{-3}$ S/cm.

5. The gel electrolyte supercapacitor of claim 1, wherein the gel electrolyte produces no fire after treatment with a flame.

6. The gel electrolyte supercapacitor of claim 1, wherein the gel electrolyte is made by a method comprising:
mixing the base and the polyol compound at a temperature of 40-60° C. to form a mixture;
cooling the mixture to 23-26° C. and adding the boric acid to form the gel electrolyte.

7. The gel electrolyte supercapacitor of claim 1, wherein:
the binding compound is at least one selected from the group consisting of polyvinylidene fluoride and n-methylpyrrolidone;
the conductive additive is at least one selected from the group consisting of graphite, activated carbon, reduced graphene oxide, carbon nanotubes, carbon nanofibers, and carbon black.

8. The gel electrolyte supercapacitor of claim 1, wherein the binding compound is polyvinylidene fluoride;
the conductive additive is carbon black; and
the substrate is an aluminum current collector.

9. The gel electrolyte supercapacitor of claim 1, wherein the inner surface is precoated with at least one boronic acid-containing polymer selected from the group consisting of poly(styreneboronic acid)-b-polystyrene, and poly(ethylene glycol)-b-poly(styrene boronic acid).

10. The gel electrolyte supercapacitor of claim 1, wherein the first mixture further comprises:
1-15 wt. % of at least one boronic acid-containing polymer selected from the group consisting of poly(styreneboronic acid)-b-polystyrene, and poly(ethylene glycol)-b-poly(styrene boronic acid), based on the total weight of the polyol compound and the boronic acid-containing polymer.

11. The gel electrolyte supercapacitor of claim 1, wherein the second mixture further comprises:

1-10 wt % of at least one boronic acid-containing polymer selected from the group consisting of poly(styreneboronic acid)-b-polystyrene, and poly(ethylene glycol)-b-poly(styrene boronic acid), based on the total weight of the conductive additive, the binding compound, the activated carbon, and the boronic acid-containing polymer.

12. The gel electrolyte supercapacitor of claim 1, having a specific capacitance of 300-350 F/g at 1 A/g;

wherein the gel electrolyte comprises 2-4 wt % of the boric acid.

13. The gel electrolyte supercapacitor of claim 12, wherein at least 90% of the initial capacitance is maintained up to 10,000 cycles.

14. The gel electrolyte supercapacitor of claim 12, wherein at least 90% of the initial capacitance is maintained after at least 30 days under ambient conditions.

15. The gel electrolyte supercapacitor of claim 12, having a specific energy of 40-55 Wh/kg at a power of 900-950 W/kg.

16. The gel electrolyte supercapacitor of claim 12, having having an equivalent series resistance of 4-8$\Omega$.

17. The gel electrolyte supercapacitor of claim 1, having an open voltage window of 0-3 V.

18. The gel electrolyte supercapacitor of claim 1, having a specific capacitance of 150-200 F/g at 1 A/g;

wherein the gel electrolyte comprises 5-7 wt % of the boric acid and 1M base.

19. A wearable device comprising the gel electrolyte supercapacitor of claim 1, wherein the supercapacitor is electrically connected to a sensor; and the supercapacitor functions as a battery.

20. The gel electrolyte supercapacitor of claim 1, comprising:

2-10 of the gel electrolyte supercapacitors connected in parallel and/or series.

* * * * *